(12) United States Patent
Jain et al.

(10) Patent No.: US 12,240,620 B2
(45) Date of Patent: Mar. 4, 2025

(54) THERMAL MANAGEMENT SYSTEM

(71) Applicant: EATON INTELLIGENT POWER LIMITED, Dublin (IE)

(72) Inventors: Rishabh Kumar Jain, Maharashtra (IN); Parag Ashok Gumaste, Pune (IN); Manoj Prakash Gokhale, Magarpatta (IN); Christopher Thomas Cantrell, Jackson, MI (US); Nikhlil Shinde, Mumbai (IN); Aniket Devendra Sachdeva, Gujarat (IN); Priyanka Dnyaneshwar Jadhav, Maharashtra (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 251 days.

(21) Appl. No.: 17/899,193

(22) Filed: Aug. 30, 2022

(65) Prior Publication Data
US 2023/0070111 A1   Mar. 9, 2023

(30) Foreign Application Priority Data

Aug. 31, 2021 (IN) .............................. 202111039332

(51) Int. Cl.
*B64D 33/08* (2006.01)
*B60L 53/20* (2019.01)
(Continued)

(52) U.S. Cl.
CPC .............. *B64D 33/08* (2013.01); *B60L 53/20* (2019.02); *B60L 58/26* (2019.02);
(Continued)

(58) Field of Classification Search
CPC .. B64D 33/08; H01M 10/613; H01M 10/625; H01M 10/63; H01M 10/6568; H01M 2220/20; B60L 53/20; B60L 58/26
See application file for complete search history.

(56) References Cited

U.S. PATENT DOCUMENTS

| | | | |
|---|---|---|---|
| 8,448,460 | B2 | 5/2013 | Dogariu et al. |
| 9,669,936 | B1 | 6/2017 | Fiterman et al. |

(Continued)

FOREIGN PATENT DOCUMENTS

| | | | | |
|---|---|---|---|---|
| CN | 111591108 A | | 8/2020 | |
| CN | 112537453 A | * | 3/2021 | ............. B64D 27/02 |

(Continued)

OTHER PUBLICATIONS

English language translation of CN112537453 to Zhang et al. Translated Nov. 2024 (Year: 2021).*

(Continued)

*Primary Examiner* — Cassey D Bauer
(74) *Attorney, Agent, or Firm* — Merchant & Gould P.C.

(57) ABSTRACT

A thermal management system enables fluid coupling of the cooling circuits for the battery and the propeller arrangements. More than one propeller arrangement can be serviced by the same cooling circuit, but distribution of the coolant may be finessed. Optional pathways are provided to use heated coolant for heating (e.g., de-icing, cabin heating, etc.) before cooling the coolant. Fluid coupling of conduits between and/or within the cooling circuits provide redundancy to accommodate various faults and equipment malfunctions.

11 Claims, 9 Drawing Sheets

(51) Int. Cl.
  *B60L 58/26* (2019.01)
  *H01M 10/613* (2014.01)
  *H01M 10/625* (2014.01)
  *H01M 10/63* (2014.01)
  *H01M 10/6568* (2014.01)

(52) U.S. Cl.
  CPC ....... *H01M 10/613* (2015.04); *H01M 10/625* (2015.04); *H01M 10/63* (2015.04); *H01M 10/6568* (2015.04); *H01M 2220/20* (2013.01)

(56) References Cited

U.S. PATENT DOCUMENTS

| | | |
|---|---|---|
| 9,780,422 B2 | 10/2017 | Dunn et al. |
| 10,076,944 B2 | 9/2018 | Jalilevand et al. |
| 10,513,982 B2 | 12/2019 | Dailey et al. |
| 10,644,367 B2 | 5/2020 | Jalilevand et al. |
| 10,710,433 B2 | 7/2020 | Graaf et al. |
| 10,794,617 B2 | 10/2020 | Moxon |
| 10,960,785 B2 | 3/2021 | Villanueva et al. |
| 11,827,370 B1 | 11/2023 | Freer |
| 2012/0085512 A1 | 4/2012 | Graaf et al. |
| 2018/0170569 A1 | 6/2018 | Brodeur |
| 2019/0100319 A1 | 4/2019 | Mackin |
| 2019/0128570 A1 | 5/2019 | Moxon |
| 2019/0356030 A1 | 11/2019 | Venkatasubramanian et al. |
| 2020/0047908 A1 | 2/2020 | Filipenko et al. |
| 2020/0298663 A1 | 9/2020 | Allgaeuer et al. |
| 2020/0339010 A1 | 10/2020 | Villanueva et al. |
| 2020/0343601 A1 | 10/2020 | Carlson |
| 2020/0355119 A1 | 11/2020 | Ribarov |
| 2020/0361304 A1 | 11/2020 | Takamatsu |
| 2020/0391876 A1 | 12/2020 | Morrison |
| 2021/0053689 A1 | 2/2021 | Lynn et al. |
| 2021/0061477 A1 | 3/2021 | Heironimus |
| 2021/0156296 A1 | 5/2021 | Xi et al. |
| 2022/0271363 A1 | 8/2022 | Burkell |
| 2022/0306305 A1 | 9/2022 | Cottrell et al. |
| 2023/0067744 A1 | 3/2023 | Cantrell et al. |
| 2023/0079696 A1 | 3/2023 | Makhe et al. |
| 2023/0202256 A1 | 6/2023 | Lonberger et al. |
| 2023/0406519 A1 | 12/2023 | Freer |

FOREIGN PATENT DOCUMENTS

| | | |
|---|---|---|
| CN | 112888584 A | 6/2021 |
| CN | 213383775 U | 6/2021 |
| DE | 10 2008 062 176 A1 | 6/2010 |
| DE | 10 2018 113 687 A1 | 12/2019 |
| EP | 3480114 A1 | 5/2019 |
| KR | 10-2016-0046262 A | 4/2016 |
| KR | 10-2019-0048379 A | 5/2019 |
| WO | 2018/154782 A1 | 8/2018 |
| WO | 2021/095395 A1 | 5/2021 |
| WO | 2022/184325 A1 | 8/2022 |

OTHER PUBLICATIONS

Extended European Search Report issued in corresponding European Patent Application No. 22192895.5, Jan. 23, 2023.

U.S. Appl. No. 63/157,478, filed Mar. 12, 2021, 25 pages.

* cited by examiner

THERMAL MANAGEMENT SYSTEM

CROSS-REFERENCE TO RELATED APPLICATION

This application claims the benefit of Indian Provisional Patent Application No. 202111039332, filed on Aug. 31, 2021, the disclosure of which is incorporated herein by reference in its entirety.

BACKGROUND

Various components within an aircraft require thermal management to operate. For example, a propeller motor and a battery powering the propeller motor both generate heat during operation and can overheat (surpass an upper temperature limit) if left uncooled. Certain components, such as the battery, also may have a lower temperature limit to operate properly. Accordingly, the aircraft is equipped with a thermal management system including cooling circuits for these components.

The thermal cycling of these components does not remain constant during a flight. Rather, each component may have a normal operating temperature based on normal power consumption during the flight and peak operating temperatures resulting from specific events occurring during the flight. For example, the heat of a motor and/or inverter of a propeller arrangement of the aircraft may increase during take-off, landing, hovering, or turning of the aircraft compared to the temperature during cruising. The heat of the battery also may cycle based on how much power is drawn by the propeller arrangements or other components during the flight. Accordingly, the thermal management system is typically configured to provide sufficient cooling for the expected elevated temperatures.

SUMMARY

Aspects of the disclosure are directed to a thermal management system for an aircraft and methods of use thereof.

In accordance with some aspects of the disclosure, the thermal management system includes a plurality of cooling circuits that may be interconnected together. In certain implementations, a cooling circuit configured to cool a propeller arrangement at a wing may be fluidly connected to another cooling circuit configured to cool a battery powering the propeller arrangement. In some such cases, the propeller arrangement cooling circuit may benefit from cooling performed by a refrigeration circuit that cools the coolant in the battery cooling circuit. In other such cases, the battery cooling circuit may benefit from air cooling provided by the radiators to the coolant of the propeller arrangement cooling circuit. In certain implementations, multiple propeller arrangement cooling circuits may be connected to the battery cooling circuit.

In accordance with other aspects of the disclosure, the thermal management system includes a single cooling circuit that provides cooling to multiple propeller arrangements. In certain implementations, a cooling circuit includes a coolant tank, a pump arrangement, and a heat exchanger (e.g., a radiator) provides cooling to two or more propeller arrangements. In certain examples, the cooling circuit provides coolant to all propeller arrangements disposed on a common wing.

In certain implementations, the single cooling circuit includes cooling lines routed in parallel so that each cooling line is directed to a respective one of the propeller arrangements. In some examples, each cooling line has a respective pump of the pump arrangement. In certain examples, two or more of the cooling lines can be fluidly coupled together if one of the cooling lines needs extra cooling (e.g., the pump associated with the cooling line fails, the propeller arrangement serviced by the cooling lines generates extra heat, etc.). In other examples, a single pump draws coolant to a flow control valve that distributes the coolant to the cooling lines. In certain examples, the flow control valve may vary the distribution of coolant between the cooling lines based on a heat load generated by the components (e.g., the propeller arrangements) serviced by the cooling lines.

In accordance with other aspects of the disclosure, a propeller arrangement cooling circuit of the thermal management system includes two possible return lines between the propeller arrangement and the heat exchanger. One of the return lines routes heated coolant from the propeller arrangement directly to the heat exchanger. The other return line routes the heated coolant along a de-icing pathway before directing the heated coolant to the heat exchanger. The de-icing pathway extends along a region of a wing that is prone to icing. For example, the de-icing pathway may extend along a front of the wing close to an outer surface of the wing. Accordingly, the heated coolant may supplement melting of the ice along the wing. In certain examples, one or more heating elements also are disposed along the wing to melt the ice.

In accordance with other aspects of the disclosure, excess heat from the refrigeration circuit and/or from one of the cooling circuits may be harvested to supplement heating of a cabin of the aircraft. For example, one or more fans may be disposed at various heat generating components of the refrigeration circuit (e.g., the condenser) to direct heat released from the heat generating component towards the cabinet. In certain examples, a heat exchanger (e.g., a radiator) may be disposed along the cooling circuits downstream of the powered component to be cooled (e.g., downstream of the battery) so that heat may be absorbed from the heated coolant of the cooling circuit. A fan disposed at the heat exchanger may then direct the released heat towards the cabin.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
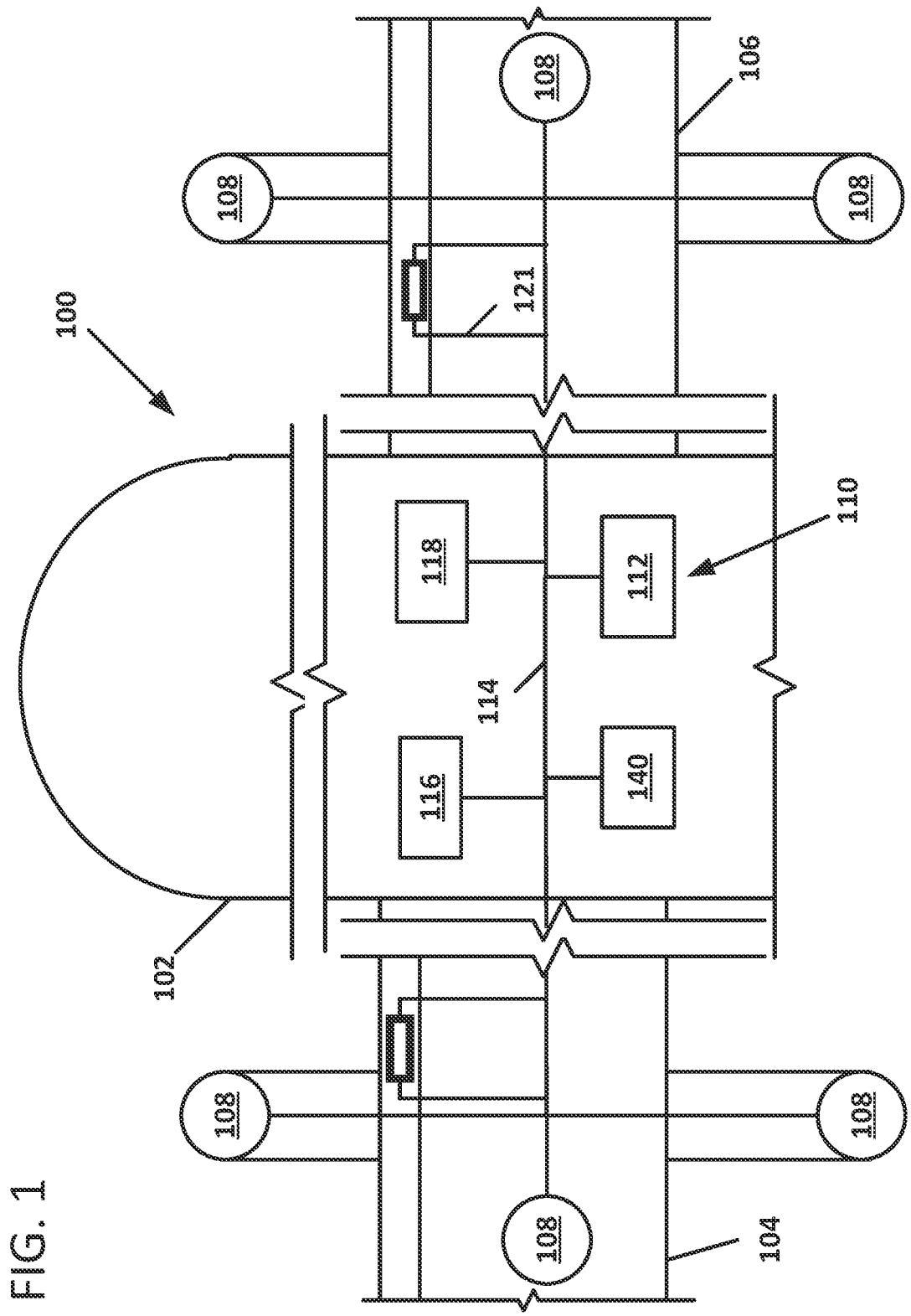
FIG. 1 is a schematic diagram of an example aircraft power system.

Referring to FIG. 1, an aircraft 100 includes a fuselage 102 defining a cabin sized to carry a pilot and one or more passengers. The aircraft 100 also includes a first wing 104 and a second wing 106 that each carry one or more propeller arrangements 108 or other propulsion components. In the example shown, three propeller arrangements 108 are disposed at each wing 104, 106. In other examples, however, each wing 104, 106 may carry any desired number or propulsion components. In certain examples, each propeller arrangement 108 includes a motor and an inverter to operate the propeller arrangement 108.

The aircraft 100 includes a power system 110 including at least one battery 112 that powers the propeller arrangements 108 via a power bus 114. In certain examples, the power system 110 also includes a super capacitor. For convenience, reference herein to cooling the battery 112 may also include cooling a supercapacitor. In the example shown, the propeller arrangements 108 are powered by a main battery 112 carried within the fuselage 102. In other examples, the propeller arrangements 108 may be powered by one or more batteries 112 carried by the wings 104, 106. For example, each propeller arrangement 108 may draw power from a respective battery 112 mounted adjacent the propeller arrangement 108 at the respective wing 104, 106. In certain implementations, the power system 110 also provides electric power to other components of the aircraft such as the flight management system, the control display unit, lighting within the cabin, fans 116 of the HVAC system, a heating element 118 of an HVAC system to heat the air within the cabin, and/or a heating element 121 of a de-icing arrangement disposed at the wings to melt ice. In certain implementations, the power system 110 also provides electric power to one or more components of a thermal management system 120 used to cool the battery 112 and/or other components such as the propeller arrangement 108.

Figure 2:
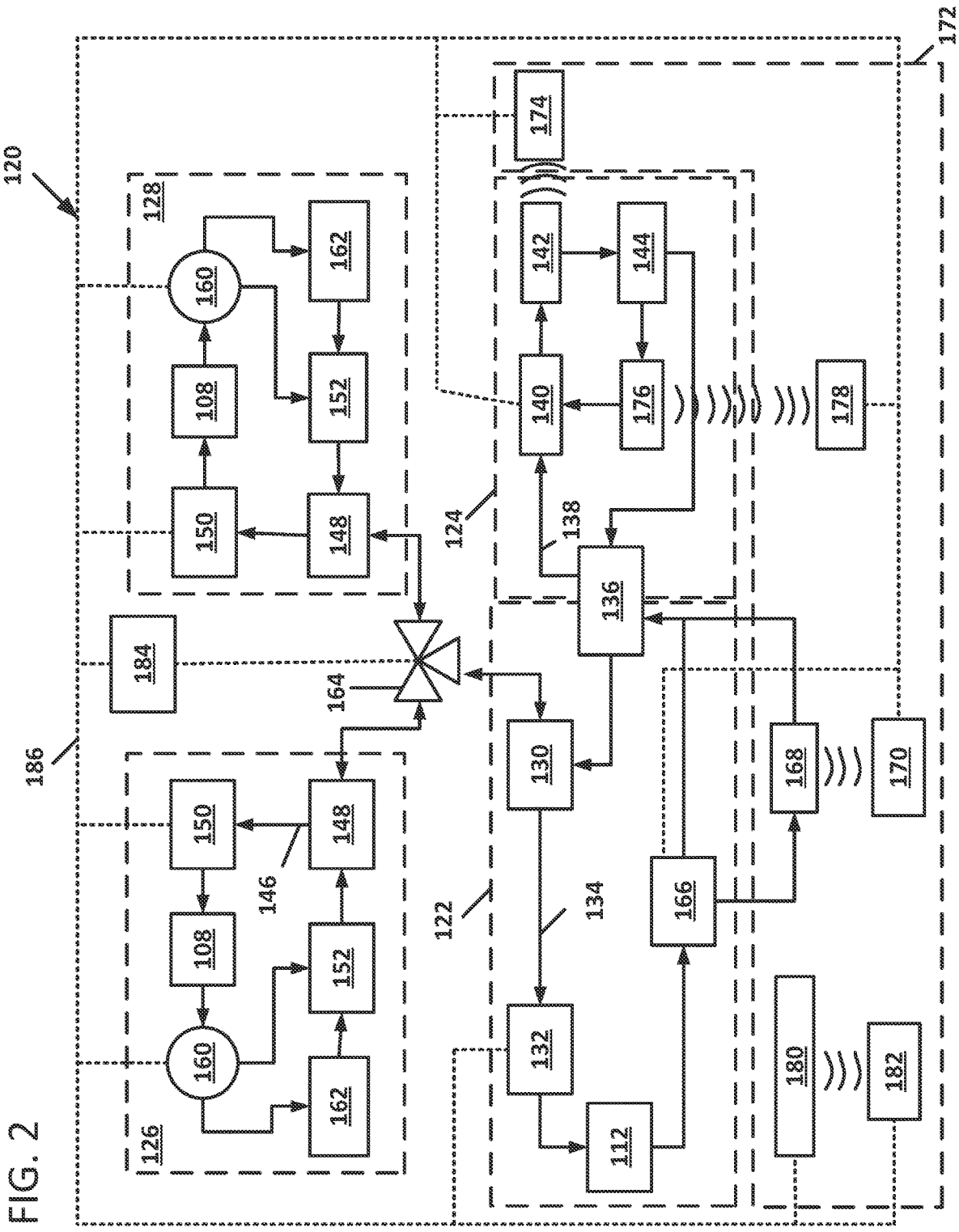
FIG. 2 is a schematic diagram of a thermal management system for use in cooling the power system, the thermal management system including one or more cooling circuits for the propellers in each wing, a battery cooling circuit, and a refrigeration circuit.

FIG. 2 illustrates an example thermal management system 120 including one or more cooling circuits 122, 124, 126, 128 that cool various components of the aircraft. In the illustrated example, the thermal management system 120 includes a battery cooling circuit 122 configured to cool one or more batteries 112 of the power system 110, a refrigeration circuit 124 configured to cool one or more of the cooling circuits 122, 126, 128, a first propeller arrangement cooling circuit 126 configured to cool one or more of the propeller arrangements 108 at the first wing 104, and a second propeller arrangement cooling circuit 128 configured to cool one or more of the propeller arrangements 108 at the second wing 106. In other examples, each propeller arrangement 108 may have a corresponding propeller arrangement cooling circuit 126. In other examples, each propeller arrangement 108 may have a respective battery 112 and battery cooling circuit 122 disposed at the respective wing 104, 106.

In certain implementations, the thermal management system 120 is configured to decrease average coolant temperatures over the full duration of a flight. Decreasing the average coolant temperatures over the duration of the flight mitigates temperature spikes in components (e.g., propeller arrangement 108, battery 112, etc.) of the power system 110 during high power events. Mitigating these temperature spikes enables components (e.g., radiators 152, chiller 136, pumps 132, 150, compressor 140, etc.) of the thermal management system 120 to be sized to handle lower heat loads, thereby reducing overall aircraft weight. Reducing the weight of the aircraft 100 is directly proportional to saved energy, which then allows the aircraft 100 to have a heavier payload or a greater mission distance.

In certain implementations, the thermal management system 120 is configured to respond to various component or system faults by fluidly connecting two or more of the cooling circuits 122, 126, 128 and/or by fluidly connecting cooling components within a cooling circuit 122, 126, 128 to ensure sufficient cooling is provided to all power components. In certain examples, the thermal management system 120 may redirect some or all coolant away from power components that are functioning at reduced capacity or that are not functioning, respectively, to redirect the coolant to other power components needing supplemental cooling (e.g., to one or more propeller arrangements compensating for a faulty propeller arrangement).

In certain implementations, the thermal management system 120 is configured to adjust the level of cooling provided to various components based on need. For example, the thermal management system 120 may be configured to spread a heat load of a power component (e.g., a power component experiencing a high power event) over multiple cooling components by fluidly connecting two or more of the cooling circuits 122, 126, 128 and/or by fluidly connecting cooling components within a cooling circuit 122, 126, 128. In certain examples, one or more of the propeller arrangements 108 may be operated at a different speed than one or more others of the propeller arrangements 108 at various points during the flight. In such cases, additional coolant flow may be supplied to the propeller arrangement(s) 108 operating at higher speeds while the propeller arrangement(s) 108 continue to operate at the higher speeds (e.g., and optionally for a predetermined period of time before and/or after the propeller arrangement(s) 108 operate at the higher speeds).

The battery cooling circuit 122 includes a tank 130 configured to hold coolant (e.g., water, propylene glycol, ethylene glycol, or other antifreeze solution), a pump 132 configured to draw the coolant from the tank 130, and a conduit 134 along which the coolant flows through the battery cooling circuit 122. During standard operation, the conduit 134 is directed from the pump 132 towards the battery 112. After absorbing heat from the battery 112, the coolant is directed to a chiller 136 at which heat from the coolant is absorbed by refrigerant passing through the refrigeration circuit 124. The cooled coolant then passes back to the tank 130.

The refrigeration circuit 124 includes a conduit 138 through which the refrigerant (e.g., a Hydrofluorocarbon such as R-134a or R410A or other refrigerant) is carried through the refrigeration circuit 124. The refrigeration circuit 124 also includes a compressor 140 configured to draw the refrigerant along the conduit 138 and to pressurize (e.g., vaporize) the refrigerant; a condenser 142 at which at least some heat is removed from the pressurized refrigerant; and an expansion valve 144 creates a pressure drop so that low temperature, low pressure refrigerant is then conveyed to the chiller 136 at which the refrigerant absorbs heat from the coolant of the battery cooling circuit 122.

Each of the propeller arrangement cooling circuits 126, 128 includes a conduit 146 through which coolant flows through the circuit. Each of the propeller arrangement cooling circuits 126, 128 also includes a tank 148, a pump arrangement 150 of one or more pumps to draw coolant from the tank 148 and circulate the coolant through the conduit 146, and a radiator 152 exposed to ambient air outside the aircraft. The coolant passes from the pump arrangement 150 to a motor and/or an inverter of one or more of the propeller arrangements 108 from which heat is absorbed by the coolant. The heated coolant is air cooled at the radiator 152 before returning to the tank 148.

In accordance with some aspects of the disclosure, one or more of the propeller arrangement cooling circuits 126, 128 is configured to assist in de-icing the respective wing 104, 106 of the aircraft 100. For example, the cooling line 146 may extend from the propeller arrangement(s) to a directional control valve 160 which selectively directs the heated coolant either to the radiator 152 or along a de-icing pathway 162. For example, when ice has not formed along the wing (e.g., in the summer), the directional control valve 160 may direct the heated coolant directly to the radiator 152 for cooling. In other examples, when de-icing of the wings 104, 106 is desired, the directional control valve 160 may direct the heated coolant along a pathway 162 disposed near a surface of the wing 104, 106 along a region prone to icing (e.g., a front of the wing 104, 106). In still other examples, the directional control valve 160 may direct a first portion of the heated coolant along the de-icing pathway 162 and a second portion of the heated coolant towards the radiator 152.

In certain implementations, routing the heated coolant along the de-icing pathway 162 supplements heat provided by one or more heating elements 121 disposed along the wings 104, 106 and, thereby, allows the heating elements 121 to be made smaller or to draw less power from the battery 112. Drawing less power from the battery 112 either allows the power to be used in other systems or causes less heat to be generated by the battery 112. Freeing up power for other systems may allow for the battery 112 to be made smaller and lighter. Reducing the power draw may mitigate the amount of battery cooling needing to be supplied by the thermal management system 120 during the de-icing process. In addition, routing the heated coolant along the de-icing pathway 162 provides some cooling and reduces the heat load on the radiator 152.

Additional information about de-ice the wings is provided in U.S. Provisional Application No. 63/157,478, filed Mar. 5, 2021, titled "System and Method for Generating Electrical Energy from Thermal Waste Energy and Removing the Thermal Waste Energy in an Aircraft," the disclosure of which is incorporated herein by reference herein in its entirety.

In some implementations, each of the coolant circuits 122, 126, 128 operates independently. In other implementations, one or more of the coolant circuits 122, 126, 128 may be fluidly coupled together by a directional control valve 164. For example, the tanks 148, 130 of each coolant circuit 122, 126, 128 may be fluidly coupled together. In certain examples, two of more of the coolant circuits 122, 126, 128 may be selectively fluidly coupled together using the directional control valves 164. For example, two or more of the coolant circuits 122, 126, 128 may be fluidly coupled during a failure of one or more components of one of the coolant circuits or during a period where one or more components of the power system 110 require extra cooling. In certain examples, the directional control valve 164 may fluidly couple together the propeller arrangement cooling circuits 126, 128 without connecting the battery cooling circuit 122. In certain examples, the directional control valve 164 may fluidly couple together the coolant of the battery cooling circuit 122 with the coolant of one of the propeller arrangement cooling circuits 126, 128. In other examples, the directional control valve 164 may fluidly couple together the coolant from the battery cooling circuit 122 and two or more (e.g., all) of the propeller arrangement cooling circuits 126, 128.

In accordance with other aspects of the disclosure, heated coolant within the battery cooling circuit 122 may be used to help heat the cabin of the aircraft 100. For example, a directional control valve 166 may be disposed within the battery cooling circuit 122 downstream of the battery 122 and upstream of the tank 136. The directional control valve 166 selectively directs the heated coolant from the battery 112 either along a first path routed directly to the chiller 136 or along a second path directed to a heat exchanger 168 (e.g., a radiator). Routing the heated coolant through the heat exchanger 168 cools the coolant, thereby reducing the heat load on the chiller 136. Further, a fan arrangement 170 of one or more fans may be disposed at the heat exchanger to blow heated air released from the heat exchanger 168 towards the aircraft cabin. In certain examples, the heat exchanger 168 and fan arrangement 170 may form part of an HVAC system 172. In certain implementations, the HVAC system 172 also may include a fan arrangement 174 of one or more fans also may be disposed at the condenser 142 of the refrigerant circuit 124 to blow heated air released by the condenser 142 towards the aircraft cabin. Finally, the HVAC system 172 also may include one or more heating elements 180 configured to generate heat and a fan arrangement 182 of one or more fans configured to blow heated air from the heating element 180 towards the cabin. In certain examples, the hating element(s) 180 are powered by the battery 112.

In accordance with other aspects of the disclosure, the refrigeration circuit 124 includes an evaporator 176 to which the expansion valve 144 may direct a portion of the cooled refrigerant. At the evaporator 176, the refrigerant may absorb some heat from the air before being directed back to the compressor 140. A fan arrangement 178 of one or more fans may be disposed at the evaporator 176 to blow cooled air towards the aircraft cabin when cooling is desired.

In certain implementations, a thermal management system (TMS) controller 184 is electrically connected (see dotted lines 186 in FIG. 2) to one or more components of the thermal management system 120 to control operation of the components. For example, the TMS controller 184 may be electrically connected to the directional control valves 160, 164, and 166 to direct coolant along the cooling circuits 122, 126, 128. In an example, the TMS controller 184 actuates the directional control valve 160 to direct some, all, or none of the heated coolant from a propeller arrangement 108 along a de-icing pathway 162. In another example, the TMS controller 184 actuates the directional control valve 164 to interconnect the coolant from two or more of the cooling circuits 122, 126, 128. In another example, the TMS controller 184 actuates the directional control valve 166 to direct some, all, or none of the heated coolant from the battery 122 to the heat exchanger 168.

In certain implementations, the TMS controller 184 also controls the operation of various components of the thermal management system 120. For example, the TMS controller 184 may control the speed of a pump 150 of a propeller arrangement cooling circuit 126, 128, thereby controlling a flow rate of coolant through the propeller arrangement cooling circuit 126, 128. In another example, the TMS controller 184 may control the speed of a compressor 140 of the refrigerant circuit 124, thereby controlling a flow rate of the refrigerant through the refrigerant circuit 124.

In certain implementations, the TMS controller 184 may control one or more components of the HVAC system 172 or may communicate with an HVAC controller to adjust operation of the components. For example, the TMS controller 184 may control or provide requests to the HVAC system 172 to control the various fans 170, 174, 178, 182 that blow air (e.g., heated air or cooled air) into the aircraft cabin.

In certain implementations, the TMS controller 184 is electrically coupled to one or more sensors T (e.g., see FIGS. 3 and 4) to monitor the temperatures of one or more components (e.g., propeller arrangement 108, battery 112, etc.) of the power system 110. In certain examples, the TMS controller 184 may monitor the temperature of the coolant within the various cooling circuits 122, 126, 128 and/or the temperature of the refrigerant within the refrigeration circuit 124. In certain examples, the TMS controller 184 may monitor the ambient temperature outside the aircraft 100 (e.g., via a temperature sensor at one or more of the radiator arrangements 152). In certain examples, the sensors T are temperature sensors. In other examples, the sensors T may include other sensors (e.g., pressure sensors) from which a temperature may be derived.

In certain implementations, the TMS controller 184 is configured to communicatively couple to an overall aircraft system controller (e.g., a flight management system). In some examples, the TMS controller 184 operates under the control of the overall aircraft system controller. In other examples, the TMS controller 184 operates independently, but obtains information from or shares information with the aircraft system controller.

Figure 3:
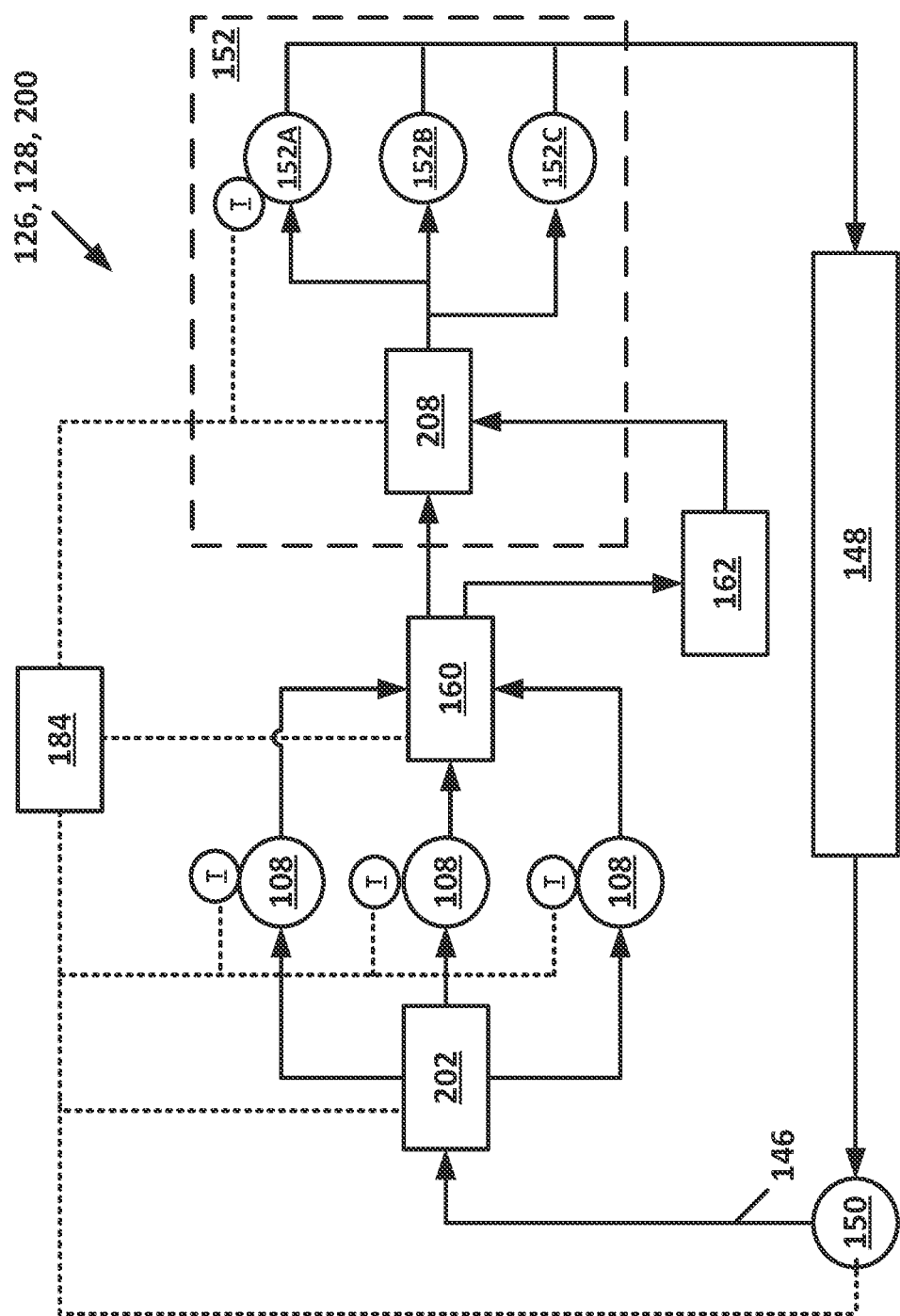
FIG. 3 is a schematic diagram of a first example implementation of a propeller arrangement cooling circuit.
Figure 4:
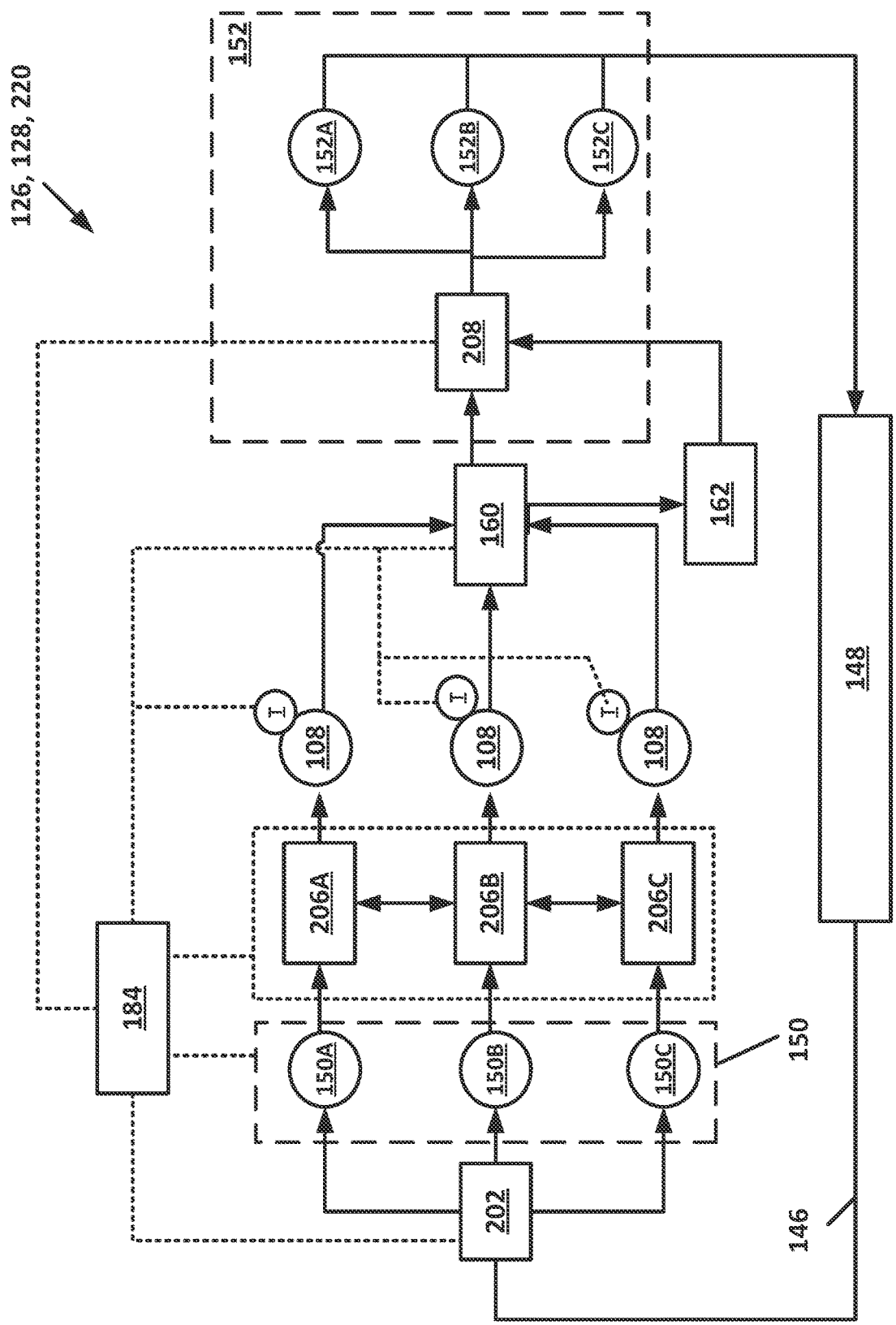
FIG. 4 is a schematic diagram of a second example implementation of a propeller arrangement cooling circuit.
Figure 5:
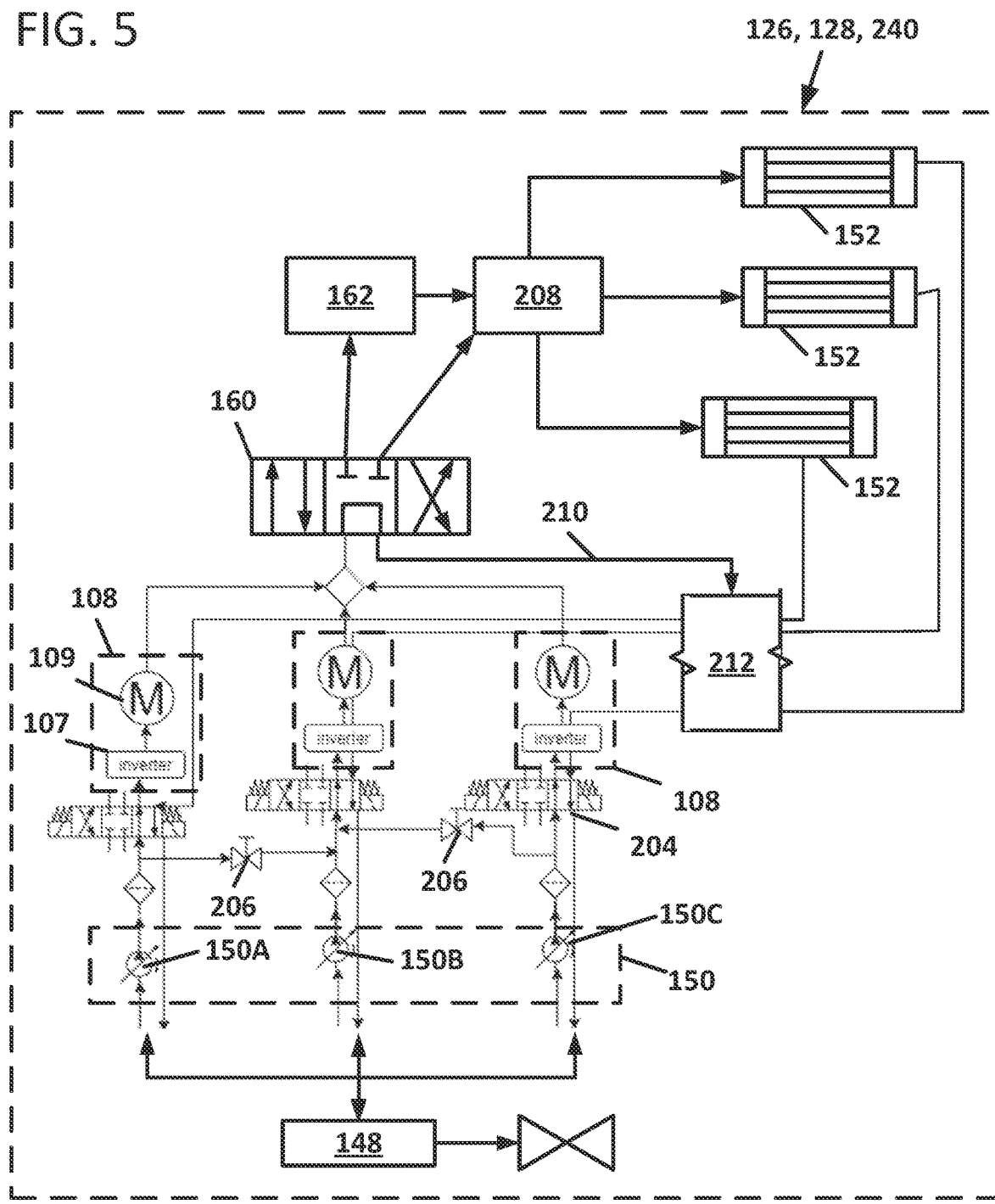
FIG. 5 is a schematic diagram of a third example implementation of a propeller arrangement cooling circuit.

FIGS. 3, 4, and 5 illustrate alternative example implementations 200, 220, 240 of a propeller arrangement cooling circuit 126, 128 suitable for use in the thermal management system 120 of FIG. 2. The propeller arrangement cooling circuit 126, 128 of each of FIGS. 3-5 is configured to provide cooling to multiple propeller arrangements 108. In certain examples, a propeller arrangement 108 includes a motor and an inverter. The propeller arrangement cooling circuit 126, 128 of each of FIGS. 3-5 includes a separate cooling line (e.g., separate conduit 146) directed to each propeller arrangement 108. The propeller arrangement cooling circuit 126, 128 of each of FIGS. 3-5 includes the coolant tank 148 and a pump arrangement 150 as shown in FIG. 2.

In FIG. 3, a flow control valve 202 is disposed downstream of the pump arrangement 150 and upstream of the separate cooling lines. The flow control valve 202 controls distribution of the coolant onto each of the cooling lines. Accordingly, the flow control valve 202 controls how much coolant is directed to each of the propeller arrangements 108. In some examples, the pump arrangement 150 includes a single pump servicing all of the cooling lines. In other examples, the pump arrangement 150 includes multiple pumps (e.g., arranged in parallel) disposed upstream of the flow control valve 202 that cooperate to service the cooling lines. In certain examples, the TMS controller 184 may manage the flow control valve 202 to vary the coolant distribution to the propeller arrangements 108 based on a heat load of each propeller arrangement 108. For example, the TMS controller 184 may direct equal amounts of coolant to the propeller arrangements 108 during cruising or other operational state of the aircraft where the heat load would be evenly distributed among the propeller arrangements 108. On the other hand, the TMS controller 184 may reduce the amount of coolant provided along one of the cooling lines so that additional coolant can be provided to another of the cooling lines (e.g., if one of the propeller arrangements 108 were actuated while another was not or if one of the propeller arrangements 108 is run at a faster speed than another of the propeller arrangements 108).

In FIG. 4, the pump arrangement 150 includes a separate pump 150A-150C for each of the cooling lines. Accordingly, the TMS controller 184 can operate the pumps 150A-150C to vary the amount of coolant provided to each cooling line based on a heat load at each propeller arrangement 108. In certain implementations, the cooling lines can be interconnected by one or more directional control valves 206A-206C based on commands from the TMS controller 184. Accordingly, if one of the pumps 150A-150C fails, coolant from one or more of the other cooling lines can be directed to the cooling line corresponding to the failed pump upstream of the propeller arrangement 108.

In both FIGS. 3 and 4, heated coolant is carried over the conduit pathway 146 from the propeller arrangements 108 to the directional control valve 160, which directs some, all, or none of the coolant along a de-icing pathway 162 and a remainder of the coolant to a radiator arrangement 152. In the example shown, the radiator arrangement 152 includes a plurality of radiators 152A-152C to which heated coolant is directed. For example, a second flow control valve 208 may be disposed downstream of the valve 160 and upstream of the radiators 152A-152C to control distribution of the heated coolant to the radiators 152A-152C. In other examples, each cooling line may be associated with a respective one of the radiators 152A-152C. In certain such examples, each cooling line also may have a respective de-icing path or a respective section of the de-icing path.

In FIG. 5, the pump arrangement 150 also includes separate pumps 150A-150C for the cooling lines. The cooling lines are connected at directional control valves 206 that allow for coolant to be shared between adjacent lines. Control valves 204 selectively open and close access to the propeller arrangements 108. Accordingly, if one of the propeller arrangements 108 experiences a fault and ceases to function, the corresponding control valve 204 can close to prevent coolant from being directed to the faulty propeller arrangement 108. Instead, the pump 150A-150C corresponding with the faulty line may aid in directing the coolant to the other cooling lines via the directional control valves 206.

The directional control valve 160 of FIG. 5 also controls whether or not the heated coolant is supplied to the de-icing pathway 162. In certain implementations, the directional control valve 160 also may direct the heated coolant along a bypass 210 to a return line 212 instead of passing the heated coolant to the radiator arrangement 152. For example, if the radiator arrangement 152 is damaged or otherwise malfunctioning, the heated coolant may be supplied to another circuit (e.g., another propeller arrangement cooling circuit 126, 128 or the battery cooling circuit 122) for cooling (e.g., using the radiator arrangement 152 at the other wing or using the chiller 136). In certain examples, the heated coolant may be directed to a heat exchanger at the fuselage to provide additional heat to the cabin.

Figure 6:
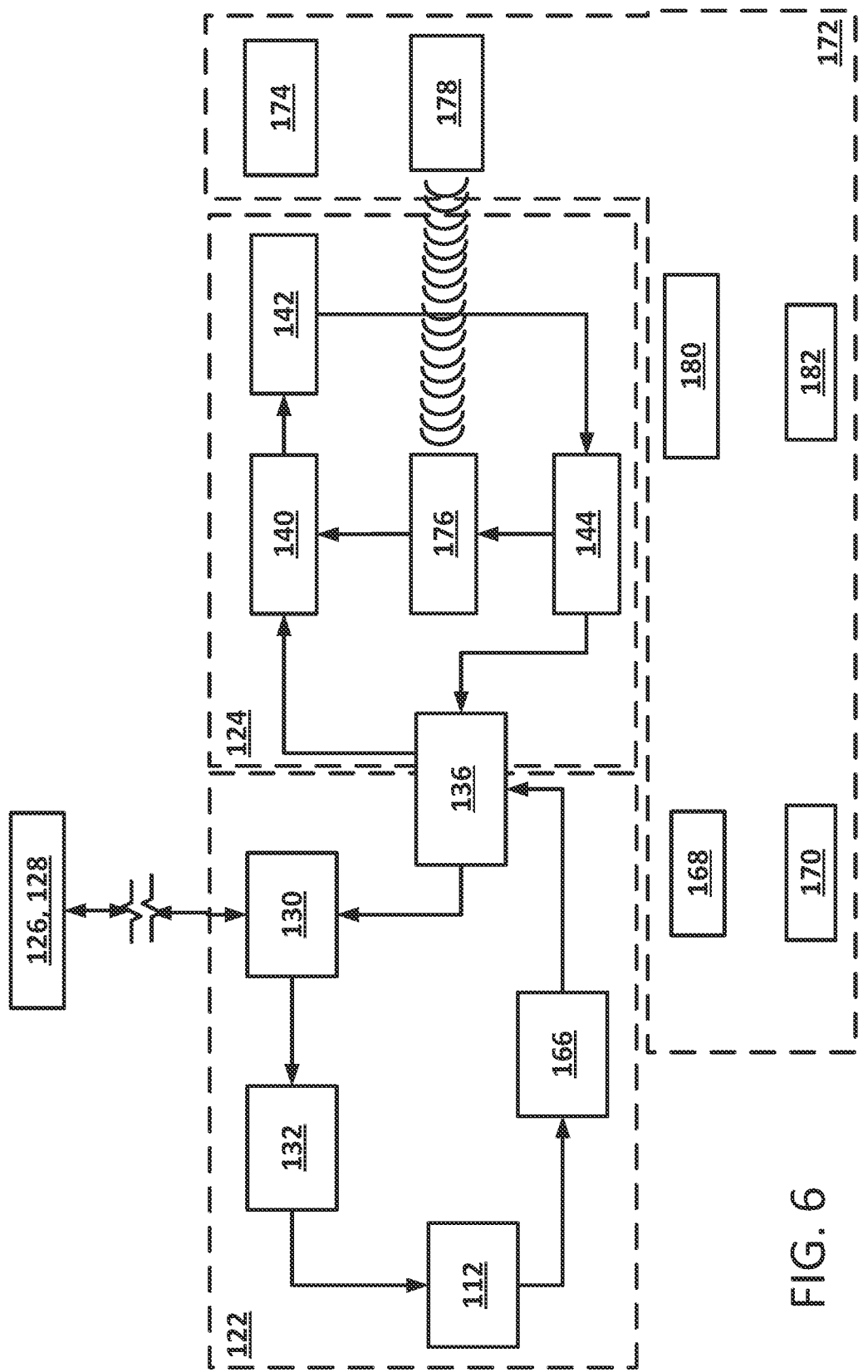
FIG. 6 shows how the battery cooling circuit and refrigeration circuit of FIG. 2 interact with an example HVAC system in warmer temperatures.
Figure 7:
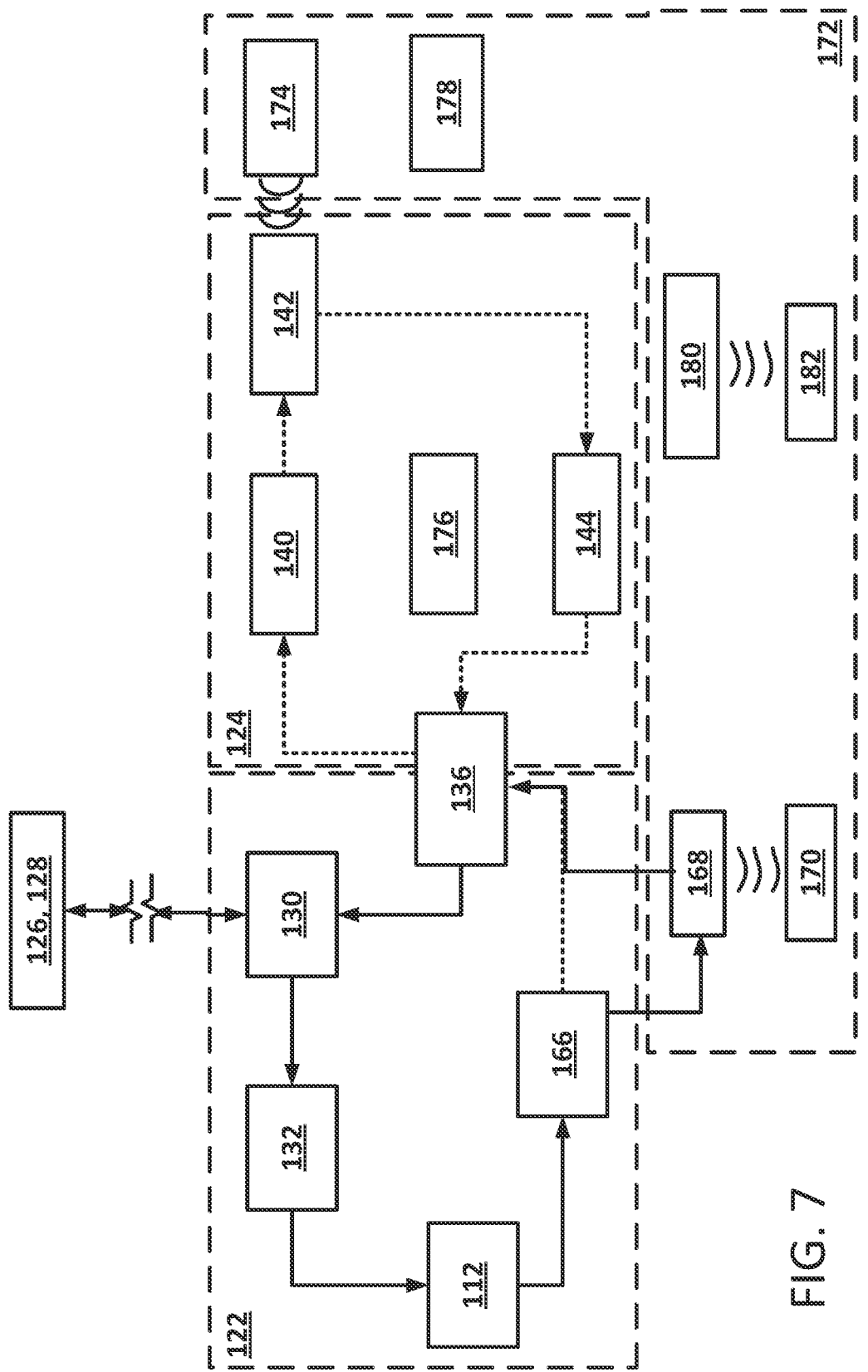
FIG. 7 shows how the battery cooling circuit and refrigeration circuit of FIG. 2 interact with an example HVAC system in cooler temperatures.

FIGS. 6 and 7 illustrate the interaction between the batter cooling circuit 122, the refrigeration circuit 124, and the HVAC system 172 based on an ambient temperature outside the aircraft. FIG. 6 shows the interaction based on warmer ambient temperatures (e.g., summer temperatures) and FIG. 7 shows the interaction based on colder ambient temperatures (e.g., winter temperatures).

In FIG. 6, the battery cooling circuit 122 is primarily cooled by the refrigerant circuit 124. In certain implementations, the battery cooling circuit 122 can be fluidly coupled to one or both of the propeller arrangement cooling circuits 126, 128. In some such examples, the coolant of the battery cooling circuit 122 may be supplementally cooled by the radiator arrangement 152 of the propeller arrangement cooling circuit(s) 126, 128. For example, on a cold day (e.g., when the ambient temperature is below 10 degrees Celsius, is below 5 degrees Celsius, is below 0 degrees Celsius), the refrigeration circuit 124 may be de-activated, thereby allowing the battery 112 to be cooled only by the motor radiators 152. In other such examples, the coolant of the propeller arrangement cooling circuit(s) 126, 128 may be supplementally cooled by the refrigerant circuit 124. Such supplemental cooling may enable the propeller arrangements 108 to be pre-chilled immediately before a peak power scenario. Such supplemental cooling may enable the propeller arrangements 108 to be cooled more efficiently on a hot day (e.g., when the ambient temperature is above is above 25 degrees Celsius, is above 30 degrees Celsius, is above 35 degrees Celsius).

Because the ambient temperature outside the aircraft 100 is warm, heat need not be provided in the cabin. Accordingly, the HVAC system 172 is not operating the heating element 180 and the fan arrangement 182. In certain implementations, the HVAC system 172 also does not operate the fan arrangement 174 to blow heat from the condenser 142 into the cabin. In certain implementations, the directional control valve 166 of the battery cooling circuit 122 does not direct heated coolant from the battery to a radiator 168. In such implementations, the HVAC system 172 does not operate the fan arrangement 170. However, if some heating of the cabin is still desired, one or more of these heat sources can be actuated (e.g., the HVAC system 172 may utilize the heat from the battery circuit coolant, the condenser waste heat, and/or the heating element 180). In certain implementations, cooling of the air within the cabin is desired.

In some such implementations, the expansion valve 176 may direct a portion of the cooled refrigerant to the evaporator 176 instead of to the chiller 136. The fan arrangement 178 may blow air over the evaporator 176 to direct cooled air to the cabin.

In FIG. 7, the battery cooling circuit 122 may be fluidly coupled to one or both of the propeller arrangement cooling circuits 126, 128 so that circuits 122, 126, 128 share coolant. Because the ambient temperatures outside the aircraft 100 are cooler (e.g., at or below freezing), the radiator arrangement(s) 152 of the propeller arrangement cooling circuit(s) 126, 128 may cool the coolant sufficient to accommodate the heat load of the propeller arrangements 108 and some or all of the heat load from the battery 112. In such examples, the compressor 140 of the refrigerant circuit 124 may be shut off or operated at a reduced power level. Both shutting off the compressor 140 and operating the compressor 140 at a reduced power level draw less power from the battery 112, may reduces the heat load generated by the battery 112.

In certain implementations, one or more heating elements 180 and a fan arrangement 182 of the HVAC system 172 may be used to heat the cabin. In certain implementations, components of the thermal management system 120 can be used to supplement heating of the aircraft cabin. For example, the directional control valve 166 may direct some or all of the coolant that absorbed waste heat from the battery towards the heat exchanger 168. The fan arrangement 170 may blow air over the heat exchanger 168 to heat the air. The heated air may then be directed to the cabin. In certain implementations, if the refrigerant circuit 124 is operating, the fan arrangement 174 may blow over the condenser 142 to direct heated air towards the cabin. In certain implementations, the heating element 180 of the HVAC system 172 may be turned off to reduce a power drain on (and heat generation at) the battery 112 and cabin heat may be provided instead by the heat exchanger 168 and/or the condenser 142.

During a flight, the various powered components of the aircraft 100 draw power generally consistently except during certain high power events (e.g., take-off, landing, hovering, turning, etc.). One or more powered components (e.g., one or more propeller arrangements 108, the battery 112, etc.) may need extra cooling during these high power events. However, these high power events tend to occur over only a small percentage of the total flight time. Accordingly, the component settings during the normal stage may be selected to accommodate heat loads produced outside of the high power events. Further, as discussed above, efficiencies may be gained within the thermal management system 120 when the aircraft 100 experiences lower ambient temperatures.

Figure 8:
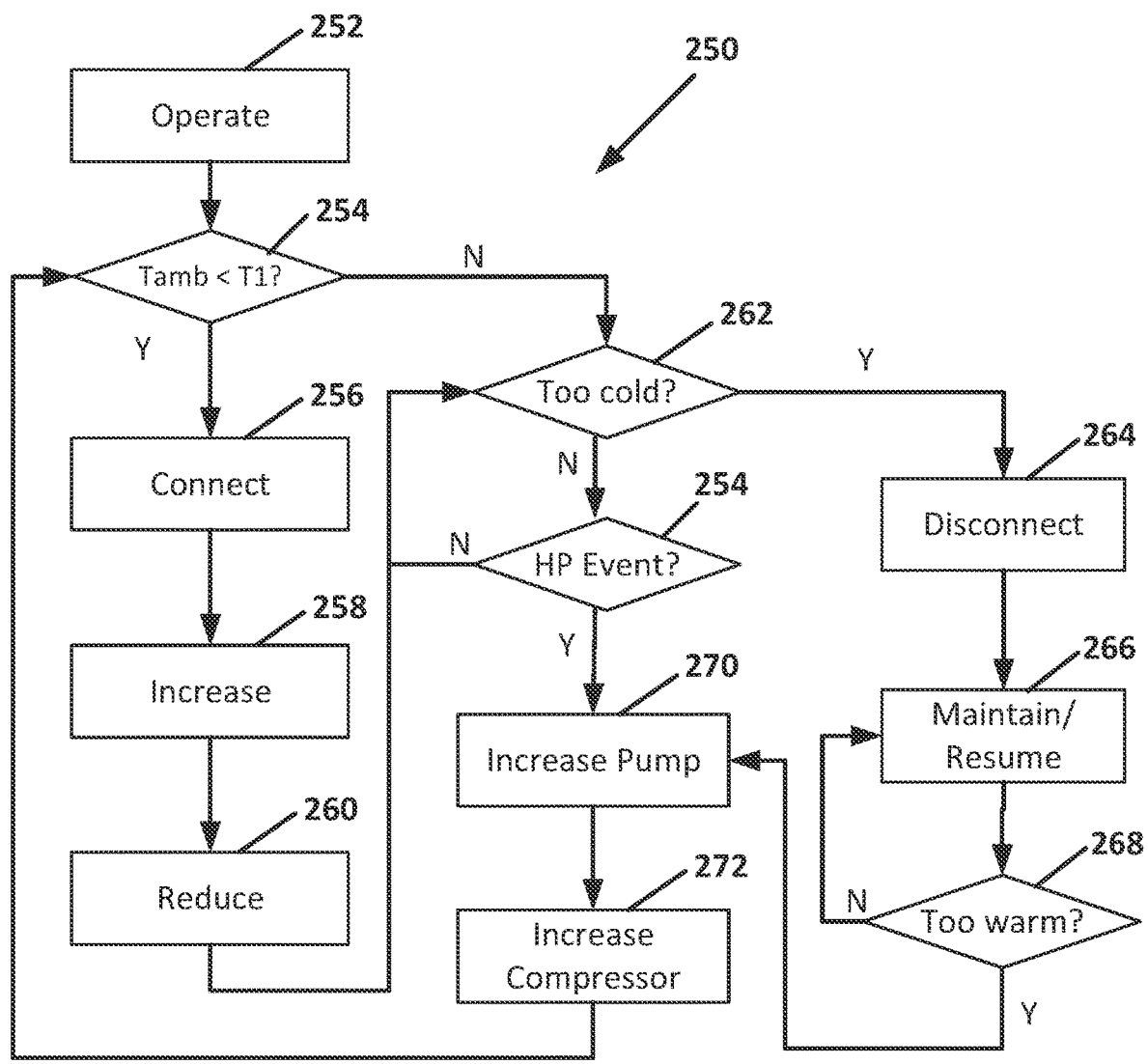
FIG. 8 is a flowchart showing how a TMS controller manages coolant and refrigerant flow within the thermal management system of FIG. 2.

FIG. 8 is a flowchart illustrating an example process 250 by which the TMS controller 184 manages the flow of the coolant and refrigerant within the thermal management system 120. The process 250 includes a first operation 252 at which the thermal management system 120 operates in a normal state in which the cooling circuits 122, 126, 128 are isolated from each other. Further, the pumps 132, 150 operate at below a maximum pump speed that is predetermined to accommodate the heat load for each circuit 122, 126, 128 outside of high power events.

In module 254, the TMS controller 184 determines whether the ambient temperature Tamb is less than a first threshold T1. In certain examples, the first threshold T1 is the minimum operating temperature for which the battery 112 is rated. Accordingly, the module 254 is determining whether the ambient temperature outside the aircraft is sufficiently low for a radiator arrangement 152 to supplement or fully handle cooling of the battery circuit 122 in addition to cooling of the associated propeller arrangement(s) 108.

If the ambient temperature is sufficiently low, then the TMS controller 184 connects the propeller arrangement cooling circuit(s) 126, 128 to the battery cooling circuit 122 at operation 256 and increases the speed of the pump(s) 150 of the propeller arrangement cooling circuit(s) 126, 128 at operation 258 to increase the flow of coolant past the radiator arrangements 152. The increased speed accommodates the additional coolant volume from the combined circuits. In certain examples, the TMS controller 184 may reduce the compressor at operation 260 to reduce the power draw on the battery 112. In an example, the TMS controller 184 may cease operation of the compressor 140. If the ambient temperature is not sufficiently low, then process 250 bypasses operations 256, 258, and 260.

At module 262, the TMS controller 184 determines whether the coolant has become too cold. For example, the TMS controller 184 may determine whether the coolant is colder than a minimum operating temperature for which the battery 112 is rated. In another example, the TMS controller 184 may determine whether the coolant has reached a lower temperature boundary that approaches, but is warmer than the minimum operating temperature for which the battery 112 is rated.

If the coolant is determined to be too cold, then the process 250 proceeds to an operation 264 at which the TMS controller 184 disconnects the battery cooling circuit 122 from the propeller arrangements 108. The TMS controller 184 maintains or resumes normal operation of the refrigeration circuit 124 including operating the compressor 140 at a normal level in operation 266.

At module 268, the TMS controller 184 determines whether or not the coolant has become too warm. For example, the TMS controller 184 may determine whether the coolant is warmer than a maximum operating temperature for which the battery 112 is rated. In another example, the TMS controller 184 may determine whether the coolant has reached a higher temperature boundary that approaches, but is cooler than the maximum operating temperature for which the battery 112 is rated. If the coolant is too warm, then the TMS controller 184 proceeds to operation 270 at which the speed of the pump 132 of the battery cooling circuit 122 is increased. Increasing the speed of the pump 132 results in a greater coolant flow past the chiller 136. The TMS controller 184 also increases the speed of the compressor 140 at operation 272, which increases the amount of refrigerant passing through the compressor 140.

Alternatively, at module 262, the TMS controller 184 may determine the coolant is not too cold and proceed to module 254. At module 254, the TMS controller 184 determines whether a high power event is occurring (e.g., the aircraft is hovering or turning) or is imminent (e.g., if the aircraft is ready to take-off or is approaching the flight plan destination). If the aircraft 100 is determined to be starting or approaching a high power event, then the TMS controller 184 may proceed to the increase operations 270, 272 to increase cooling at the battery cooling circuit 122 using the refrigeration circuit 124 as described above.

Figure 9:
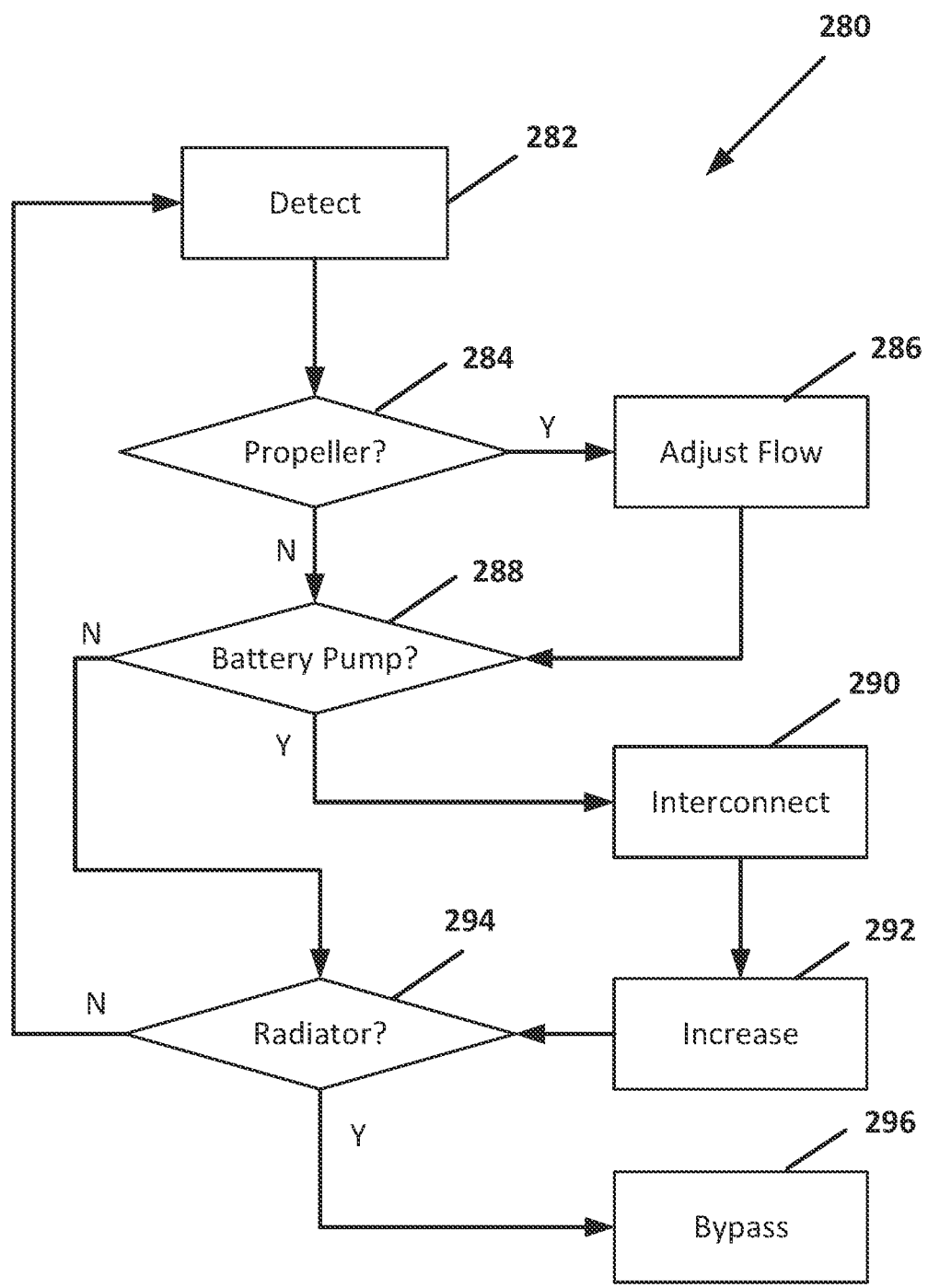
FIG. 9 is a flowchart showing how the TMS controller manages the thermal management system upon detecting one or more equipment faults.

FIG. 9 is a flowchart illustrating an example process 280 by which the TMS controller 184 manages the flow of the coolant and refrigerant within the thermal management system 120 upon detecting a fault in one or more components of the aircraft 100. The process 280 begins at a detect operation 282 at which a fault is detected. For example, the TMS controller 184 may receive an error message or system fault message indicating a malfunction of one of the components.

The process 280 proceeds to a first module 284 where the TMS controller 184 determines whether the detected fault indicates a failure of one or more of the propeller arrangements 108. If one of the propeller arrangements 108 fails, then the TMS controller 184 reduces or stops coolant flow to the faulty propeller arrangement 108 at operation 286. For example, the TMS controller 184 may close a directional control valve 204 of FIG. 5 to block coolant flow to the faulty propeller arrangement 108 and open a directional control valve 206 to direct the blocked coolant to still functional propeller arrangements 108. In another example, the TMS controller 184 may cease or reduce operation of a pump 150 associated with the cooling line of the faulty propeller arrangement 108. In another example, the TMS controller 184 may cause the flow control valve 202 of FIG. 3 to direct coolant only to cooling lines servicing still functional propeller arrangements 108 or to reduce the coolant flow to a propeller arrangement 108 operating at a reduced capacity.

At module 288, the TMS controller 184 determines whether the detected fault indicates a failure of the pump 132 of the battery cooling circuit 122. If the battery pump 132 has failed, then the TMS controller 184 actuates the directional control valve 164 to fluidly couple the battery cooling circuit 122 to one or both propeller arrangement cooling circuits 126, 128 at operation 290 so that the pump(s) 150 of the propeller arrangement cooling circuit(s) 126, 128 circulate(s) the coolant through all of the connected circuits 122, 126, 128. Optionally, at operation 292 the TMS controller 184 may increase a speed at which the pump(s) 150 of the propeller arrangement cooling circuit(s) 126, 128 flow(s).

At a module 294, the TMS controller 184 determines whether the detected fault indicates a failure of one or more of the radiators 152 at the wings 104, 106 of the aircraft 100. For example, the TMS controller 184 may determine that one or more of the radiators 152 is blocked, leaking, or otherwise malfunctioning. If the radiator 152 is faulty, then the TMS controller 184 adjusts the heated coolant flow of the relevant propeller arrangement cooling circuit 126, 128 to bypass the faulty radiator 152 at operation 296. For example, the TMS controller 184 may cause the flow control valve 208 to direct flow only to the still functional radiators 152. In certain examples the TMS controller 184 may adjust the directional control valve 164 to direct the heated coolant from the relevant propeller arrangement cooling circuit 126, 128 to the battery cooling circuit 122 if an insufficient number of radiators 152 remain functioning.

The thermal management system 120 has flexibility to provide redundancy to accommodate various types of component faults. The thermal management system 120 also provides flexibility to take advantage of external factors (e.g., ambient temperature) to enhance the efficiency of the thermal management system. The thermal management system 120 also allows for selection of one or more optional pathways that provide synergy in using heated coolant to supplement heating (e.g., of the wings for de-icing, of the cabin as part of the HVAC system, etc.).

Aspects of the Disclosure

1. A thermal management system for an aircraft having a plurality of first propellers disposed at a first wing, a plurality of second propellers disposed at a second wing, and a cabin, the thermal management system comprising:
    a first cooling circuit disposed at the first wing of the aircraft, the first cooling circuit including:
      a first tank,
      a first pump arrangement configured to draw coolant from the first tank;
      a plurality of first cooling lines that are each routed in parallel to a first motor/inverter of a respective one of the first propellers;
      a first valve arrangement through which the first cooling lines are fluidly coupled together; and
    an electronic controller configured to determine at which one or more of the first motor/inverters coolant is needed and to control the first valve arrangement and/or the first pump arrangement to direct the coolant from the first tank to the determined one or more of the first motor/inverters.

2. The coolant system of aspect 1, wherein the first pump arrangement includes a first pump configured to draw coolant from the first tank and to direct the coolant to the first valve arrangement, and wherein the first valve arrangement includes a flow control valve at which the coolant is selectively routed to one or more of the cooling lines.

3. The coolant system of aspect 2, wherein the first pump of the first pump arrangement is one of a plurality of pumps disposed in parallel to direct the coolant to the first valve arrangement.

4. The coolant system of aspect 2, wherein the electronic controller is electrically connected to the flow control valve, the electronic controller being configured to manage how the coolant is routed to the cooling lines at the flow control valve.

5. The coolant system of aspect 1, wherein the first pump arrangement includes a respective pump disposed at each cooling line upstream of the respective first motor/inverter, wherein the electronic controller is configured to separately run each of the pumps to draw coolant independent of the other pumps of the first pump arrangement.

6. The coolant system of aspect 5, wherein the first valve arrangement includes a respective directional control valve disposed downstream of the pump and upstream of the first motor/inverter of each cooling line.

7. The coolant system of aspect 5 or aspect 6, wherein the first valve arrangement includes a directional control valve disposed upstream of each pump.

8. The coolant system of any of aspects 1-7, further comprising a second cooling circuit disposed at the second wing of the aircraft, the second cooling circuit including:
a second tank,
a second pump arrangement configured to draw coolant from the second tank;
a plurality of second cooling lines that are each routed in parallel to a second motor/inverter of a respective one of the second propellers; and
a second valve arrangement through which the second cooling lines are fluidly coupled together;
wherein the controller is configured to determine at which one or more of the second motor/inverters coolant is needed and to control the second valve arrangement and/or the second pump arrangement to direct the coolant from the second tank to the determined one or more of the second motor/inverters.

9. The coolant system of aspect 8, further comprising a directional control valve arrangement disposed between the first tank and the second tank, the directional control valve arrangement being configured to selectively connect and disconnect the first and second tanks.

10. The coolant system of any of aspects 8-9, further comprising a battery cooling circuit including:
a third tank;
a third pump arrangement;
a battery;
a chiller; and
a directional control valve arrangement configured to selectively connect and disconnect the first, second, and third tanks to share coolant therebetween, wherein the electronic controller is electrically coupled to the directional control valve arrangement.

11. The thermal management system of any of aspects 1-10, wherein the first cooling circuit further includes a radiator arrangement disposed downstream of the motor/inverter and upstream of the first tank, the radiator arrangement cooling the coolant passing through the radiator arrangement using ambient air outside the aircraft.

12. The coolant system of any of aspects 1-11, further comprising: a first temperature sensor arrangement configured to monitor temperatures at the motor/inverters of the first propellers; wherein the electronic controller is configured to receive temperature data from the first temperature sensor arrangement and to manage the first valve arrangement based on the temperature data.

13. The coolant system of any of aspects 8-11, further comprising: a first temperature sensor arrangement configured to monitor temperatures at the motor/inverters of the first propellers; wherein the electronic controller is configured to receive temperature data from the first temperature sensor arrangement and to connect the first and second tanks when the temperature data from one of the first and second temperature sensor arrangements exceeds a predetermined threshold.

14. A thermal management system for an aircraft having a plurality of first propellers disposed at a first wing, a plurality of second propellers disposed at a second wing, and a cabin, the thermal management system comprising:
a first cooling circuit disposed at the first wing of the aircraft, the first cooling circuit including:
a first tank,
a plurality of first cooling lines that are each routed in parallel to a first motor/inverter of a respective one of the first propellers, and
a first pump arrangement configured to draw coolant from the first tank along the first cooling lines;
a second cooling circuit disposed at the second wing of the aircraft, the second cooling circuit including:
a second tank,
a plurality of second cooling lines that are each routed in parallel to a second motor/inverter of a respective one of the second propellers, and
a second pump arrangement configured to draw coolant from the second tank along the second cooling lines;
a directional control valve selectively coupling together the first and second tanks; and
an electronic controller electrically coupled to the directional control valve, the electronic controller configured to selectively connect and disconnect the first and second tanks.

15. The thermal management system of aspect 14, further comprising a third cooling circuit including:
a third tank;
a battery;
a third pump arrangement configured to draw fluid from the third tank towards the battery; and
a chiller;
wherein the directional control valve selectively couples together the first, second, and third tanks under management from the electronic controller.

16. The thermal management system of aspect 14, wherein each of the first and second cooling circuits further includes a respective radiator arrangement disposed downstream of the respective motor/inverter and upstream of the respective one of the first and second tanks, each radiator arrangement cooling the coolant passing therethrough using ambient air outside the aircraft.

17. A thermal management system for an aircraft having a plurality of propellers operated by respective motor/inverters powered by a battery, the thermal management system comprising:
a first cooling circuit disposed at the first wing of the aircraft, the first cooling circuit including:
a first tank,
a plurality of first cooling lines that are each routed in parallel to a respective one of the first motor/inverters, a first pump arrangement configured to draw coolant from the first tank along the first cooling lines, and
a radiator arrangement disposed downstream of the first motor/inverters and upstream of the first tank to cool coolant flowing from the first cooling lines towards the first tank; and
a battery cooling circuit including:
a second tank,
a battery cooling line extending from the second tank, past
a second pump arrangement configured to draw fluid from the second tank towards the battery, and
a chiller; and
a directional control valve configured to selectively couple together the first and second tanks, wherein the coolant cooled by the radiator arrangement is directed through the battery cooling circuit when the first and second tanks are coupled together.

18. The thermal management system of aspect 17, further comprising an electronic controller configured to manage the directional control valve.

19. A thermal management system for an aircraft including propeller disposed at a wing that has a section prone to icing at or below freezing ambient temperatures, the thermal management system comprising:
a tank of coolant;
a motor/inverter disposed at the first wing to operate the propeller;
a pump configured to draw fluid from the tank towards the motor/inverter; and
a directional control valve disposed downstream of the motor/inverter, the directional control valve being configured to selectively direct coolant to one of a first return path and a second return path, the first return path extending along the section of the wing, the second return path being shorter than the first return path and being spaced from the section of the wing.

20. The thermal management system of aspect 19, wherein the propeller is one of a plurality of propellers disposed at the wing; and wherein the motor/inverter is one of a plurality of motor/inverters, wherein each of the motor/inverters operates one of the propellers, and wherein the same tank of coolant cools the motor/inverters of each of the propellers in a common cooling circuit.

21. The thermal management system of aspect 19 or aspect 20, wherein the wing is a first wing, the section prone to icing is a first section, and the tank of coolant, the motor/inverter, the pump, and the directional control valve are included in a first cooling circuit disposed at the first wing; and wherein the aircraft also includes a second propeller at a second wing that has a second section prone to icing at or below freezing ambient temperatures, and wherein the thermal management system includes a second cooling circuit disposed at the second wing, the second cooling circuit also including a directional control valve configured to selectively direct coolant to one of a first return path and a second return path of the second cooling circuit, the first return path of the second cooling circuit extending along the second section of the second wing, the second return path of the second cooling circuit being shorter than the first return path of the second cooling circuit and being spaced from the second section of the second wing.

22. A thermal management system for a battery powered aircraft including a cabin, the thermal management system comprising:
a battery cooling circuit including:
a tank of coolant;
a pump configured to circulate coolant from the tank towards the battery; and
a chiller configured to cool the coolant;
a refrigeration circuit configured to cool the chiller, the refrigeration circuit including:
a compressor configured to circulate refrigerant through the refrigeration circuit;
a condenser disposed upstream of the compressor;
an expansion valve upstream of the condenser;
a first return path extending directly from the expansion valve to the chiller of the battery cooling circuit; and
a second return path extending from the expansion valve to an evaporator and then to the chiller; and
an HVAC circuit including:
a fan disposed at the condenser to blow heat released from the condenser towards the cabin of the aircraft.

23. The thermal management system of aspect 22, wherein a directional control valve is disposed upstream of the chiller and downstream of the battery; and wherein the battery cooling circuit includes a first path extending from the directional control valve directly to the chiller and a second path extending from the directional control valve to a radiator; and wherein the HVAC circuit includes a fan disposed at the radiator to blow heat released from the radiator towards the cabin of the aircraft.

24. The thermal management system of aspect 22 or aspect 23, wherein the HVAC circuit further includes an electrical heating element and a fan disposed at the heating element to blow heat released by the electrical heating element towards the cabin.

25. The thermal management system of any of aspects 22-24, wherein the refrigeration circuit also includes an evaporator, and wherein the HVAC circuit further includes a fan disposed at the evaporator to blow cool air released at the evaporator towards the cabin.

26. The thermal management system of any of aspects 22-25, wherein the tank of coolant of the battery cooling circuit is fluidly coupled to a radiator arrangement disposed at a wing of the aircraft, the radiator arrangement cooling coolant passing therethrough using ambient temperature outside the aircraft.

27. A method of cooling a power system of an aircraft using a thermal management system including a battery cooling circuit to cool a battery of the aircraft and a propeller arrangement cooling circuit to cool at least one propeller arrangement of the aircraft, the battery cooling circuit interfacing with a refrigeration circuit at a chiller, the propeller arrangement cooling circuit including at least one radiator providing an interface between coolant in the propeller arrangement cooling circuit and air outside the aircraft, the method comprising:
determining an ambient temperature of the air outside the aircraft is below a first threshold;
fluidly connecting the battery cooling circuit to the propeller arrangement cooling circuit; and
reducing or stopping operation of a compressor within the refrigeration circuit.

28. The method of aspect 27, further comprising increasing a pump flow within the propeller arrangement cooling circuit.

29. The method of aspect 27, further comprising:
determining a high power event is starting or is imminent; and
increasing a speed of the compressor within the refrigeration circuit during the high power event.

30. The method of aspect 29, wherein increasing the speed of the compressor includes starting the compressor.

31. The method of aspect 29, further comprising increasing coolant flow within the battery cooling circuit by increasing a speed of a pump of the battery cooling circuit.

32. The method of any of aspects 27-31, further comprising:
   determining that a coolant temperature is below a second threshold; and
   fluidly disconnecting the battery cooling circuit from the propeller arrangement cooling circuit.

33. The method of aspect 32, further comprising resuming operation of the compressor.

34. The method of aspect 32, wherein the second threshold is selected based on a minimum operating temperature for which the battery is rated.

35. The method of any of aspects 27-33, further comprising:
   determining that a temperature of a coolant is above a third threshold;
   increasing a speed of the compressor; and
   increasing a speed of a pump through which the coolant is flowing.

36. The method of aspect 35, wherein the third threshold is selected based on a maximum operating temperature for which the battery is rated.

37. The method of any of aspects 27-36, wherein the first threshold is no more than 10 degrees Celsius.

38. A method of cooling components of an aircraft using a thermal management system including a battery cooling circuit to cool a battery of the aircraft and a propeller arrangement cooling circuit to cool at least one propeller arrangement of the aircraft, the method comprising:
   identifying a reduction in speed of a first propeller arrangement;
   directing at least a portion of coolant of the propeller arrangement cooling circuit from the first propeller arrangement through the propeller arrangement cooling circuit to a second propeller arrangement that is not operating at a reduced speed.

39. The method of aspect 38, wherein identifying a reduction in speed includes detecting a fault in the first propeller arrangement.

40. The method of aspect 38, wherein identifying a reduction in speed includes detecting a ceasing of operation of the first propeller arrangement.

41. The method of any of aspects 28-40, wherein directing at least the portion of coolant comprises fluidly connecting cooling lines within the propeller arrangement cooling circuit, wherein each cooling line extends to a respective one of the propeller arrangements before the cooling lines are fluidly connected.

42. The method of any of aspects 28-40, wherein directing at least the portion of the coolant comprises actuating a flow control valve to direct coolant along cooling lines leading to pump arrangements in proportion to power drawn by the pump arrangements.

43. A method of cooling a battery of an aircraft using a thermal management system, the method comprising:
   providing a battery cooling circuit including a cooling line leading from a first tank, to a first pump arrangement, to a battery of the aircraft, and to a chiller that provides an interface between the coolant and a refrigerant in a refrigeration circuit;
   fluidly coupling the coolant of the battery cooling circuit to a propeller arrangement cooling circuit so that the coolant of the battery cooling circuit circulates along a common path with coolant of the propeller arrangement cooling circuit, the propeller arrangement cooling circuit including a second tank, a second pump arrangement, and a radiator at which coolant in the propeller arrangement cooling circuit interfaces with ambient air outside the aircraft.

44. The method of aspect 43, wherein fluidly coupling the coolant of the battery cooling circuit to the propeller arrangement cooling circuit is performed in response to detecting a temperature of the coolant of the battery cooling circuit; and determining the temperature exceeds a threshold selected based on a maximum operating temperature for which the battery is rated.

45. The method of aspect 43, wherein fluidly coupling the coolant of the battery cooling circuit to the propeller arrangement cooling circuit is performed in response to detecting a malfunction in the first pump.

46. The method of aspect 43, further comprising reducing or ceasing operation of a compressor of the refrigeration circuit.

47. A method of cooling a propeller arrangement of an aircraft using a thermal management system, the method comprising:
   providing a propeller arrangement cooling circuit including a cooling line leading from a first tank, to a first pump, to the propeller arrangement, to a radiator arrangement of the aircraft;
   detecting a fault in a first radiator of the radiator arrangement; and
   controlling coolant flow through the radiator arrangement to at least partially bypass the first radiator and to direct the bypassed coolant towards a second radiator.

48. The method of aspect 47, wherein detecting a fault includes detecting a blockage or leakage of the first radiator.

49. The method of aspect 47, wherein the second radiator is disposed on a common wing with the first radiator.

50. The method of aspect 47, wherein the propeller arrangement cooling circuit is a first propeller arrangement cooling circuit; and wherein controlling the coolant flow through the radiator arrangement comprises fluidly coupling the propeller arrangement cooling circuit to a second propeller arrangement cooling circuit including the second radiator, the second propeller arrangement cooling circuit being disposed on a different wing than the first propeller arrangement cooling circuit.

51. The method of aspect 47, wherein controlling the coolant flow through the radiator arrangement comprises fluidly coupling the propeller arrangement cooling circuit to a battery cooling circuit and directing the coolant to the battery cooling circuit instead of passing by the first radiator.

52. A method of cooling a propeller arrangement of an aircraft using a thermal management system, the method comprising:
   providing a propeller arrangement cooling circuit at a first wing of the aircraft, the propeller arrangement cooling circuit including a tank and a pump arrangement configured to draw coolant from the tank and direct the coolant towards the propeller arrangement, which heats the coolant; and
   operating a directional control valve of the propeller arrangement cooling circuit to direct at least a portion of the heated coolant along a de-icing path extending along a forward section of the first wing of the aircraft instead of along a more direct path to a radiator arrangement disposed at the wing, the de-icing path providing a longer path to the radiator arrangement.

53. The method of aspect 52, wherein operating the directional control valve of the propeller arrangement cooling circuit to direct at least a portion of the heated coolant along a de-icing path comprises operating the directional control valve to direct all of the heated coolant along a de-icing path.

54. The method of aspect 52, further comprising actuating the directional control valve to direct all of the heated coolant along the more direct path.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A thermal management system for an aircraft having a plurality of first propellers disposed at a first wing, a plurality of second propellers disposed at a second wing, and a cabin, the thermal management system comprising:
    a first cooling circuit disposed at the first wing of the aircraft, the first cooling circuit including:
        a first tank,
        a first pump arrangement configured to draw coolant from the first tank;
        a plurality of first cooling lines that are each routed in parallel to a first motor/inverter of a respective one of the first propellers;
        a first valve arrangement through which the first cooling lines are fluidly coupled together; and
    an electronic controller configured to determine at which one or more of the first motors/inverters coolant is needed and to control the first valve arrangement and/or the first pump arrangement to direct the coolant from the first tank to the determined one or more of the first motors/inverters.

2. The thermal management system of claim 1, wherein the first pump arrangement includes a first pump configured to draw coolant from the first tank and to direct the coolant to the first valve arrangement, and wherein the first valve arrangement includes a flow control valve at which the coolant is selectively routed to one or more of the cooling lines.

3. The thermal management system of claim 2, wherein the electronic controller is electrically connected to the flow control valve, the electronic controller being configured to manage how the coolant is routed to the cooling lines at the flow control valve.

4. The thermal management system of claim 1, wherein the first pump arrangement includes a respective pump disposed at each cooling line upstream of the respective first motor/inverter, wherein the electronic controller is configured to separately run each of the pumps to draw coolant independent of the other pumps of the first pump arrangement.

5. The thermal management system of claim 4, wherein the first valve arrangement includes a respective directional control valve disposed downstream of the pump and upstream of the first motor/inverter of each cooling line.

6. The thermal management system of claim 1, further comprising a second cooling circuit disposed at the second wing of the aircraft, the second cooling circuit including:
    a second tank,
    a second pump arrangement configured to draw coolant from the second tank;
    a plurality of second cooling lines that are each routed in parallel to a second motor/inverter of a respective one of the second propellers; and
    a second valve arrangement through which the second cooling lines are fluidly coupled together;
    wherein the controller is configured to determine at which one or more of the second motors/inverters coolant is needed and to control the second valve arrangement and/or the second pump arrangement to direct the coolant from the second tank to the determined one or more of the second motors/inverters.

7. The thermal management system of claim 6, further comprising a directional control valve arrangement disposed between the first tank and the second tank, the directional control valve arrangement being configured to selectively connect and disconnect the first and second tanks.

8. The thermal management system of claim 6, further comprising a battery cooling circuit including:
    a third tank;
    a third pump arrangement;
    a battery;
    a chiller; and
    a directional control valve arrangement configured to selectively connect and disconnect the first, second, and third tanks to share coolant therebetween, wherein the electronic controller is electrically coupled to the directional control valve arrangement.

9. The thermal management system of claim 1, wherein the first cooling circuit further includes a radiator arrangement disposed downstream of the motor/inverter and upstream of the first tank, the radiator arrangement cooling the coolant passing through the radiator arrangement using ambient air outside the aircraft.

10. The thermal management system of claim 1, further comprising: a first temperature sensor arrangement configured to monitor temperatures at the first motors/inverters; wherein the electronic controller is configured to receive temperature data from the first temperature sensor arrangement and to manage the first valve arrangement based on the temperature data.

11. The thermal management system of claim 8, further comprising: a first temperature sensor arrangement configured to monitor temperatures at the first motors/inverters;
    a second temperature sensor arrangement configured to monitor temperatures at the second motors/inverters; wherein the electronic controller is configured to receive temperature data from the first and second temperature sensor arrangements and to connect one of the first and second tanks when the temperature data from one of the first and second temperature sensor arrangements exceeds a predetermined threshold.

* * * * *